(12) United States Patent
Descombes

(10) Patent No.: US 8,125,201 B2
(45) Date of Patent: Feb. 28, 2012

(54) DC-DC CONVERTER FOR A LOW POWER ELECTRONIC CIRCUIT

(75) Inventor: Arthur Descombes, Kerzers (CH)

(73) Assignee: EM Microelectronic-Marin SA, Marin (CH)

( * ) Notice: Subject to any disclaimer, the term of this patent is extended or adjusted under 35 U.S.C. 154(b) by 236 days.

(21) Appl. No.: 12/367,389

(22) Filed: Feb. 6, 2009

(65) Prior Publication Data
US 2009/0206819 A1 Aug. 20, 2009

(30) Foreign Application Priority Data

Feb. 6, 2008 (EP) .................................... 08151121

(51) Int. Cl.
*G05F 1/00* (2006.01)
(52) U.S. Cl. .......................... 323/268; 323/272; 323/282
(58) Field of Classification Search .................. 323/265, 323/266, 271, 273–275, 282, 285, 349, 351
See application file for complete search history.

(56) References Cited

U.S. PATENT DOCUMENTS 5,335,162 A * 8/1994 Martin-Lopez et al. ........ 363/97
(Continued)

FOREIGN PATENT DOCUMENTS

EP  1 139 552 A2  10/2001
(Continued)

OTHER PUBLICATIONS

European Search Report issued in corresponding application No. EP08151121, completed Jul. 15, 2008.

*Primary Examiner* — Adolf Berhane
*Assistant Examiner* — Emily Pham
(74) *Attorney, Agent, or Firm* — Griffin & Szipl, P.C.

(57) ABSTRACT

The DC-DC converter (21) is for integration in a low power transceiver (100). The converter is able to supply an output voltage that is higher than the input voltage. The converter includes two distinct variable voltage regulator circuits (3 and 4). The first variable voltage regulator circuit (3) is arranged to operate at a first frequency and a second variable voltage regulator circuit (4) is arranged to operate at a second frequency, which is lower than the first frequency. The converter further includes switching means connected to each variable voltage regulator circuit for selecting one of the two regulator circuits to switch on.

16 Claims, 3 Drawing Sheets

U.S. PATENT DOCUMENTS

| | | |
|---|---|---|
| 5,881,012 A | 3/1999 | Kawasaki et al. |
| 7,336,058 B1 * | 2/2008 | Lo et al. ......... 323/269 |
| 7,576,521 B2 * | 8/2009 | Komiya ......... 323/268 |
| 7,737,672 B2 * | 6/2010 | Kudo ......... 323/284 |
| 2003/0080624 A1 | 5/2003 | Belson et al. |
| 2004/0066238 A1 | 4/2004 | Dickmann |
| 2008/0246453 A1 * | 10/2008 | Cagno et al. ......... 323/282 |

FOREIGN PATENT DOCUMENTS

JP  2004-120826  4/2004

* cited by examiner

DC-DC CONVERTER FOR A LOW POWER ELECTRONIC CIRCUIT

This application claims priority from European Patent Application No. 08151121.4, filed Feb. 6, 2008, the entire disclosure of which is incorporated herein by reference.

The present invention generally concerns a DC-DC converter integrated in a low power transceiver. The converter is arranged to supply an output voltage that is different from the input voltage.

BACKGROUND OF THE INVENTION

DC-DC converters integrated in low power transceiver circuits, which can generally supply a higher output voltage than the input voltage, are known in the prior art. These converters generally include a controller operating at a certain frequency, which is often a high frequency. This controller acts on a regulating loop and a voltage booster circuit. Thus, the input voltage is raised to a desired level and then regulated so that it is stable. For example, a charge pump to raise the input voltage is known from the US patent document no US 2004/0066238.

Generally, these converters are used to operate as a specific power supply, thus delivering a surplus current for applications that use large amounts of electrical resources, or for external peripheral units. For example, in a transceiver circuit, data transmission and reception are operations that are not necessarily performed at every moment, but which use a high level of electric power. Thus, a powerful supply is not necessary normally, but becomes so when a communication is made, hence the necessity for a specific power source supplying the necessary surplus.

Converters that generally operate at a single frequency to supply a surplus current, raise problems when it becomes necessary to supply a low quantity of current continuously for powering an external peripheral unit, for example. Indeed, these converters have the drawback of only working in a single operating mode, and having a regulation circuit that is unable to remain efficient over a long period of time.

SUMMARY OF THE INVENTION

The invention concerns a DC-DC converter, which overcomes the aforementioned drawbacks of the prior art, by providing a converter that is able to be efficient when supplying a stable voltage source, whatever the electrical power consumption of the transceiver.

The invention therefore concerns the aforecited DC-DC converter, which is characterized in that it includes two distinct variable voltage regulator circuits, a first variable voltage regulator circuit being arranged to operate at a first frequency and a second variable voltage regulator circuit being arranged to operate at a second frequency lower than the first frequency. The converter further includes switching means connected to each variable voltage regulator circuit for selecting, and turning on one of the two variable voltage regulators on the basis of an external electrical parameter provided to the converter.

Thus, in accordance with a first embodiment of the present invention, a DC-DC converter for integration in a low power transceiver is provided, wherein the converter is able to supply an output voltage that is higher than the input voltage, wherein the converter includes two distinct variable voltage regulator circuits, a first variable voltage regulator circuit arranged to operate at a first frequency with a first regulating mode and a second variable voltage regulator circuit arranged to operate at a second frequency, lower than the first frequency, with a second regulating mode, and wherein the converter further includes switching means, which is connected to each variable voltage regulator circuit for selecting one of the two regulator circuits to be switched on the basis of an external electrical parameter supplied to the converter.

Advantageous second through tenth embodiments of the converter, in accordance with the present invention, are summarized as follows. In accordance with a second embodiment of the present invention, the first embodiment is modified so that the first variable voltage regulator circuit includes variation means for varying and regulating the voltage, and wherein the second variable voltage regulator circuit includes oscillation means and detection means, which cooperate with each other to monitor the voltage level of the output voltage relative to a minimum threshold and a maximum threshold. In accordance with a third embodiment of the invention, the second embodiment is further modified so that the second variable voltage regulator circuit is arranged for pumping the output voltage as soon as the voltage reaches the minimum threshold, the variable voltage regulator circuit pumping the threshold voltage from the minimum threshold to the maximum threshold.

In accordance with a fourth embodiment of the present invention, the first embodiment is modified so that the first variable voltage regulator circuit authorises a first peak-to-peak voltage variation at a working frequency that is the first frequency. In accordance with a fifth embodiment of the present invention, the first embodiment is modified so that the second variable voltage regulator circuit authorises a second peak-to-peak voltage variation, which is higher than the first variation, at a working frequency that is the second frequency. In accordance with a sixth embodiment of the present invention, the first embodiment is modified so that it further includes means for regulating the variation ratio between the output voltage and the input voltage. In accordance with a seventh embodiment of the present invention, the sixth embodiment is further modified so that a voltage divider is the voltage variation ratio regulating means.

In accordance with an eighth embodiment of the present invention, the first embodiment is modified so that the first variable voltage regulator circuit is capable of starting to work when the converter is in normal operating mode, and wherein the second variable voltage regulator circuit is capable of starting to work when the converter is in low power mode. In accordance with a ninth embodiment of the present invention, the second embodiment is further modified so that the detection circuit operates in pulsed mode and thus measures the output voltage relative to the minimum threshold and maximum threshold at regular intervals. In accordance with a tenth embodiment of the present invention, the sixth embodiment is further modified so that the regulating means 6 further includes filtering means for extending the time between two pumping operations, in low power mode.

One advantage of the DC-DC converter lies in its polyvalence, since it is thus capable of operating efficiently both when the level of current consumption is low and when it is high. Indeed, the fact that there are two variable voltage regulator circuits operating at different working frequencies means that there are different features for each regulator circuit. Thus, the fact that means are provided for selecting one regulator circuit or another means that, depending upon the current consumption level of the transceiver circuit, the best suited circuit can be selected.

Moreover, it should be stressed that the DC-DC converter according to the present invention is also capable of acting like a voltage dropper.

The invention also concerns a transceiver, which has the peculiar feature of including the DC-DC converter presented above.

The advantage of this transceiver is that it can be powered by a lower than normal voltage source, of between 0.85 and 1.5 V instead of 3 V, which means that a battery of reduced size can be used, while still being able to power the circuit in order to transmit and receive data with a higher voltage than the battery voltage.

Other advantageous embodiments, according to the present invention, are summarized by transceiver embodiments eleven through sixteen. In accordance with an eleventh embodiment of the present invention, a low power transceiver includes a control unit used for controlling the transceiver, wherein the control unit controls a demodulation loop and a frequency synthesiser for transmitting and receiving signals via an antenna, wherein the transceiver further includes the DC-DC converter according to first embodiment to the tenth embodiment in the same chip as the other transceiver elements.

In accordance with a twelfth embodiment of the invention, the eleventh embodiment is modified so that the control unit is capable of controlling external peripheral units that can be connected to the transceiver and supplied with voltage by the DC-DC converter. In accordance with a thirteenth embodiment of the invention, the eleventh embodiment is modified so that the control unit of the transceiver supplies the electrical parameter that controls the switching means. In accordance with a fourteenth embodiment of the invention, the eleventh embodiment is modified so that the control unit of the transceiver is capable of being inhibited by one of the external peripheral units, so that the peripheral unit can supply the electrical parameter that controls the switching means. In accordance with a fifteenth embodiment of the invention, the fourteenth embodiment is modified so that the control unit of the transceiver is capable of being inhibited by a controller connected to the transceiver so that the controller can supply the electrical parameter that controls the switching means. In accordance with a sixteenth embodiment of the present invention, the eleventh embodiment is modified so that the DC-DC converter can supply a higher voltage than the supply voltage, so as to be used for powering the demodulation loop and the frequency synthesiser when signals are transmitted and received.

BRIEF DESCRIPTION OF THE DRAWINGS

The objects, advantages and features of the DC-DC converter and the associated transceiver circuit will appear more clearly in the following detailed description of at least one embodiment of the invention given solely by way of non-limiting illustration, with reference to the annexed drawing, in which.

DETAILED DESCRIPTION

In the following description, those parts of the DC-DC converter and the transceiver circuit that are well known to those skilled in the art in this technical field will be explained only in a simplified manner.

Figure 1:
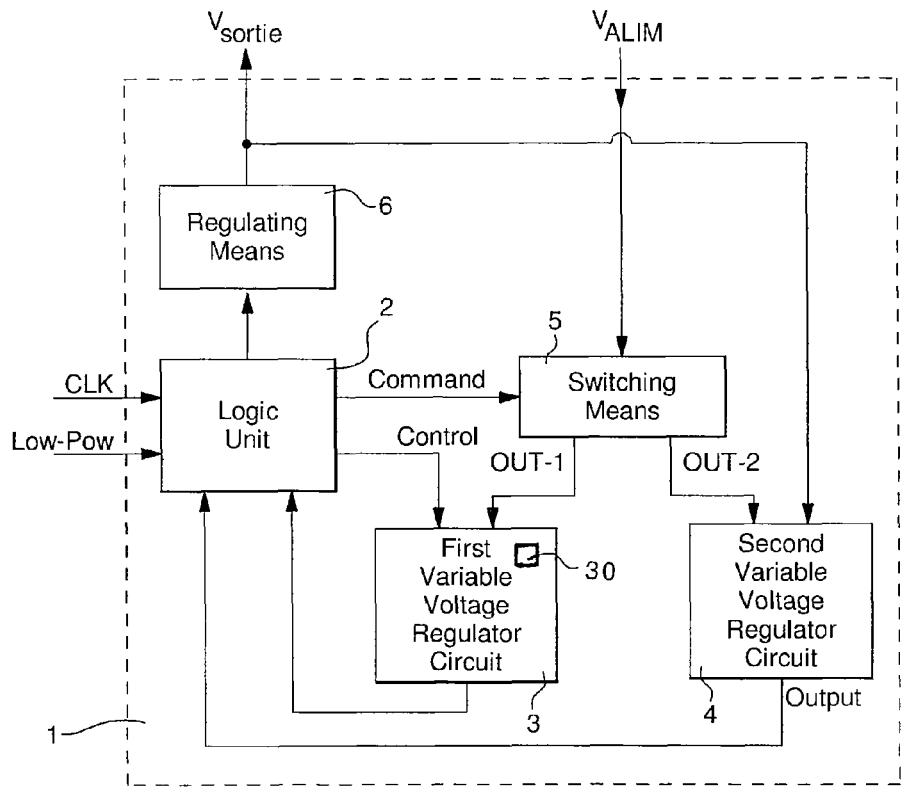
FIG. 1 shows schematically the DC-DC converter according to the present invention.

FIG. 1 shows schematically the DC-DC converter according to the present invention. This DC-DC converter includes a control logic unit 2 used for regulating the current for a first variable voltage regulator circuit 3. This DC-DC converter can be implanted in an electronic circuit, such as the transceiver circuit shown in FIG. 3. The logic unit 2 is connected to the transceiver circuit by at least two signals CLK and Low-Pow. Logic unit 2 is also connected to the two variable voltage regulator circuits 3 and 4 and to voltage variation ratio regulating means 6. The DC-DC converter further includes switching means 5, which are controlled by logic unit 2 and which can choose between the two variable voltage regulator circuits.

Logic unit 2 first of all forms the control interface between the DC-DC converter and the circuit in which the latter is placed, namely a transceiver circuit. Logic unit 2 has at least two inputs and at least two outputs. The inputs are the signals CLK and Low-Pow, which are respectively the clock signal and the operating mode command signal delivered to the converter in accordance with an electrical parameter. The outputs of this unit are the signal COMMAND, which acts on switching means 5 and the signal CONTROL, which acts on the first variable voltage regulator circuit 3.

Clock signal CLK is used for clocking the converter during normal use, whereas the command signal Low-Pow is used for placing the DC-DC converter according to the present invention in one or other of the possible operating modes. Two main operating modes exist: the normal mode, used when maximum current consumption is required, and the low power consumption mode, used when stable minimum power consumption is required. It will, of course, be clear that other operating modes may be programmed.

Thus, following the logic state of this signal Low-Pow, the converter will be placed in one or other of its operating modes. The element triggering the passage of the converter from one mode to another is an electrical parameter provided to the converter by an external element. This electrical parameter may be, for example, the current quantity required for the converter. Logic unit 2 is also used for regulating the current and the voltage exiting the regulator circuits to avoid damaging, or destroying the various elements of the converter, but also of the circuit in which the converter is placed.

The two variable voltage regulator circuits 3 and 4 are both used for converting the input voltage by either raising or lowering its value. The peculiar feature of these variable voltage regulator circuits is that they are different from each other. Indeed, these two regulator circuits 3 and 4 do not operate at the same working frequency. The first regulator circuit 3 operates at a first working frequency, whereas the second variable voltage regulator circuit 4 operates at a second working frequency, preferably at a lower frequency than the first frequency. It will, of course, be clear that the choice of working frequency for the regulator circuits depends upon a certain number of parameters, which are not indispensable for understanding the present invention. In addition, the first variable voltage regulator circuit 3 includes variation means 30 for varying and regulating the voltage, and the second variable voltage regulator circuit 4 includes oscillation means 11 and detection means 12, which cooperate with each other to monitor the voltage level of the output voltage relative to a minimum threshold and a maximum threshold.

At the converter output, there are regulating means 6, which are used for altering the voltage variation ratio. The voltage variation can thus be regulated at the converter output. In order to do this, regulating means 6 are located between logic unit 2 and the output.

These variation ratio regulating means 6 taken the form here of a voltage divider, but could also take the form of any other means that can alter the variation ratio between the output voltage and the input voltage. This voltage divider can thus alter the desired output voltage level.

Preferably, these regulating means may not be fixed. The regulating means can vary in accordance with the desired output voltage and they type of converter required. Thus, the DC-DC converter according to the present invention may be either a voltage booster type converter or a voltage dropper type converter. For the voltage divider, which acts as regulating means according to one of the advantageous embodiments of the invention, the variation ratio is altered by changing the resistance value or by varying potentiometers. The regulating means provides the DC-DC converter with extra flexibility.

Moreover, regulating means 6 can include filtering means at the output of the voltage variation ratio system between the input and the output. These filtering means, such as a capacitor for example, have the effect of smoothing the output voltage of the DC-DC converter.

Switching means 5 are located between the supply voltage and the voltage regulating stage. They include two inputs and two outputs. One of the inputs is connected to supply voltage $V_{ALIM}$. The second input receives the signal COMMAND, sent by logic unit 2, for operating switching means 5. The outputs Out-1 and Out-2 are each connected to a respective variable voltage regulator circuit. Switching means 5 are used for selecting one or other of the two variable voltage regulator circuits, depending upon the desired converter operating mode. The fact that there are two variable voltage regulator circuits that are different from each other means that one can switch from one circuit to the other in accordance with the demands made on the converter. This is achieved by routing supply voltage $V_{ALIM}$ across one or the other of outputs Out-1 or Out-2 depending upon the desired operating mode.

The DC-DC converter according to the present invention includes, for this purpose, a convention variable voltage regulator circuit 3 and a specific variable voltage regulator circuit 4. Conventional variable voltage regulator circuit 3 is a voltage regulator circuit which is generally found in DC-DC converters and which includes a voltage regulating stage followed by a regulator loop and a controller. In this type of circuit, the input voltage enters the regulator stage, and is then regulated using an assembly, which further comprises an impulse width modulator and a controller. This assembly is used for modulating the voltage and limiting the current to avoid damaging the circuit. In our case, it is logic unit 2 that is responsible for regulating variable voltage regulator circuit 3 via the signal CONTROL.

It should be pointed out that in this type of variable voltage regulator circuit, the quantity of current could be supplied in accordance with the circuit frequency. In fact, the higher the frequency, the more frequently regulation is carried out. If regulation is carried out frequently, the output voltage from the converter does not have time to increase sharply, giving a high mean current value. This also has the advantage of providing an output voltage that does not fluctuate much, since the circuit regulates at a high frequency.

However, the problem that arises is that this type of circuit is inefficient in providing a low current quantity. This is why it is therefore necessary to add another voltage regulator circuit 4, which is efficient in providing a low current quantity, to this conventional variable voltage regulator circuit 3.

Figure 2:
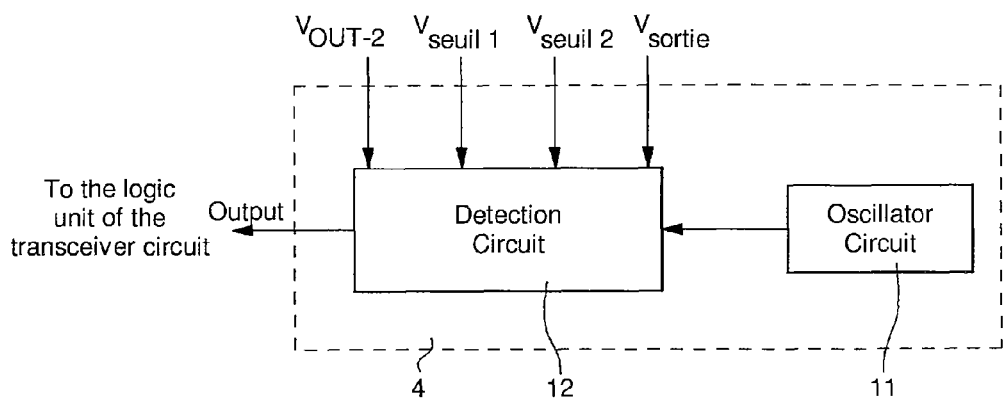
FIG. 2 shows schematically the second variable voltage regulator circuit according to the present invention.

FIG. 2 shows the specific voltage regulator circuit 4. This circuit operates on the principle of "all or nothing" and mainly comprises an oscillator circuit 11 and a detection circuit 12. The oscillator circuit works at a frequency that can be selected to optimise power consumption and thus take the most appropriate form. Advantageously, the oscillator circuit can be an RC oscillator, which consumes less power. This variable voltage regulator circuit 4 operates using two voltage thresholds, inside the converter, around the desired output voltage, the difference between these voltages defining the peak-to-peak amplitude of the output voltage.

The principle of voltage regulator circuit 4 is that, when detection circuit 12 observes that the output voltage $V_{sortie}$ reaches the minimum threshold, which is fixed, oscillator circuit 11 starts to operate in order to pump the voltage to make it increase. Output voltage $V_{sortie}$ continues to be pumped until the output voltage reaches the second threshold $V_{seuil2}$, which is the maximum threshold. Once the second voltage threshold $V_{seuil2}$ has been reached, the oscillator circuit is switched off in order to let the output voltage decrease until it again reaches the minimum threshold $V_{seuil1}$ and a new cycle can start.

Filtering means, which can be integrated in the variation ratio regulating means, can optimise these cycles. As a direct consequence of these filtering means, the DC-DC converter output signal is smoothed. However, such smoothing indirectly results in a lengthening of the period of time between two pumps of the output voltage. The voltage is smoothed. This optimisation can be improved by altering the filtering means, such as, for example, by adding capacitors.

Unlike the conventional variable voltage regulator circuit, this circuit, which uses the "all or nothing" principle, is clocked at a lower frequency that allows a low current quantity to be efficiently supplied.

Advantageously, the detection circuit can operate in pulsed mode, i.e. it is not permanently operating. The detection circuit then compares the output voltage with the two thresholds at regular intervals, which leads to a reduction in power consumption as the circuit is switched off between each detection impulse.

Preferably, the peak-to-peak amplitude, i.e. the voltage variation around output voltage $V_{sortie}$ when the conventional variable voltage regulator circuit 3 is selected, is lower than the voltage variation around output voltage $V_{sortie}$, when specific variable voltage regulator circuit 4 is selected. This is caused by the voltage stability requirement, which is less when specific circuit 4 rather than conventional circuit 3 supplies current.

Thus, the use of these two variable voltage regulator circuits in the same converter means that a low or high quantity of current can be supplied efficiently in any circumstances. According to FIG. 1, this association is permitted by switching means 5, which, let us not forget, is connected between the supply voltage and the two variable voltage regulator circuits.

The DC-DC converter receives a control signal Low-Pow from the exterior, i.e. from the circuit in which it is placed. This signal is representative of the desired operating mode. It can control the converter, i.e. cause it to pass from one operating mode to another, either low power consumption mode or normal mode. This signal, whose state is dictated by an external electrical parameter, is thus processed by control unit 2, which will convert this into a signal COMMAND and act on the switching means.

Thus, depending upon the logic state of this signal COMMAND, switching means 5 will select one or other of the variable voltage regulator circuits. The selection to operate one variable voltage regulator circuit or the is made by directing the supply voltage to one or other of the two variable voltage regulator circuits via outputs Out-1 and Out-2.

Thus, depending upon the state of the signal Low-Pow and thus of signal COMMAND, one or other of the two variable voltage regulator circuits will be selected, which means that the supply voltage will be directed to the selected regulator circuit. This voltage will thus be sent to the variation stage and the regulator loop of the regulator circuit, to be converted, then to control unit 2, so that the control unit can perform its current limiter function.

As specified above, the DC-DC converter according to the present invention is for integration in an electronic circuit. Preferably, the converter is integrated in a transceiver circuit. Advantageously, this will be a low power transceiver circuit clocked at 2.4 Ghz that can be used in portable or wireless apparatus, such as watches, telephones or even wireless computer mice.

Figure 3:
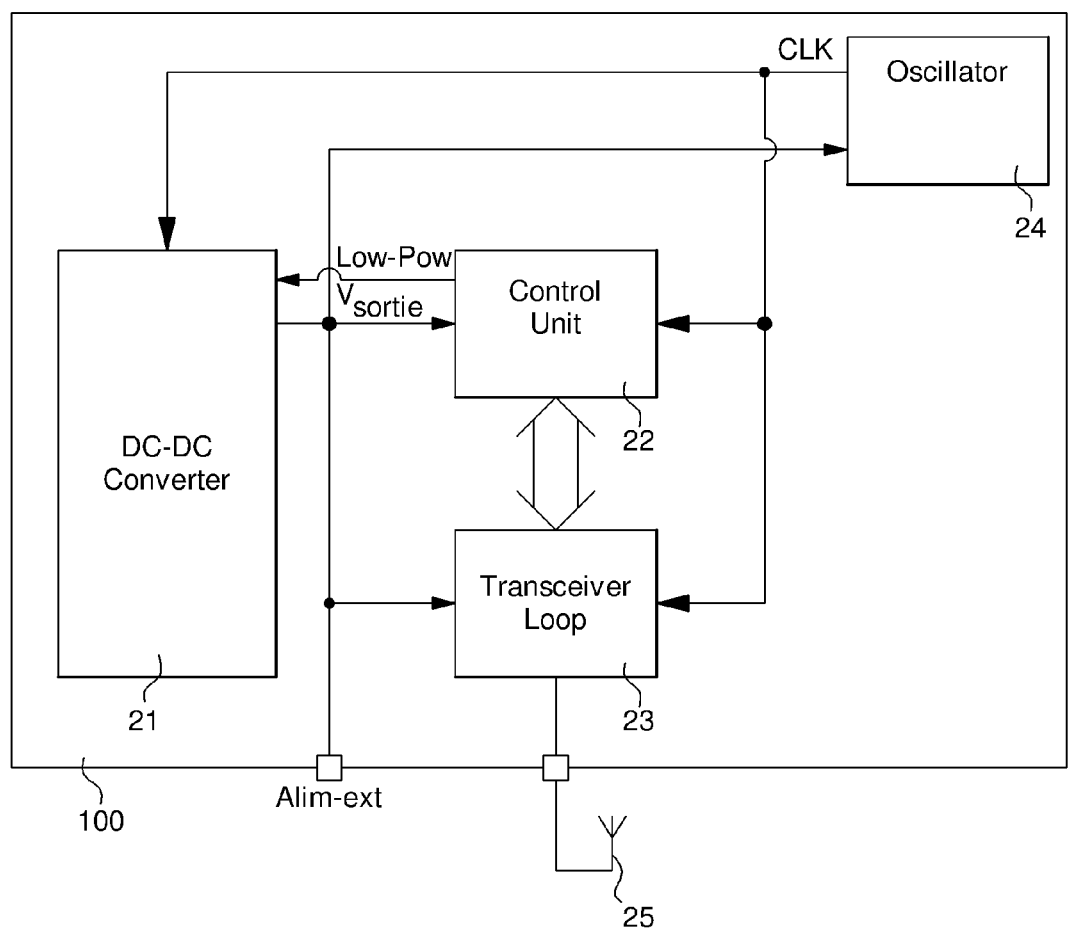
FIG. 3 shows schematically the transceiver circuit according to the present invention.

FIG. 3 shows this transceiver circuit 100. This circuit further includes the DC-DC converter 21, described above, a control unit 22, an oscillator 24, responsible for clocking the circuit elements, and a transceiver loop 23. All of these elements are thus on the same chip.

Figure 4:
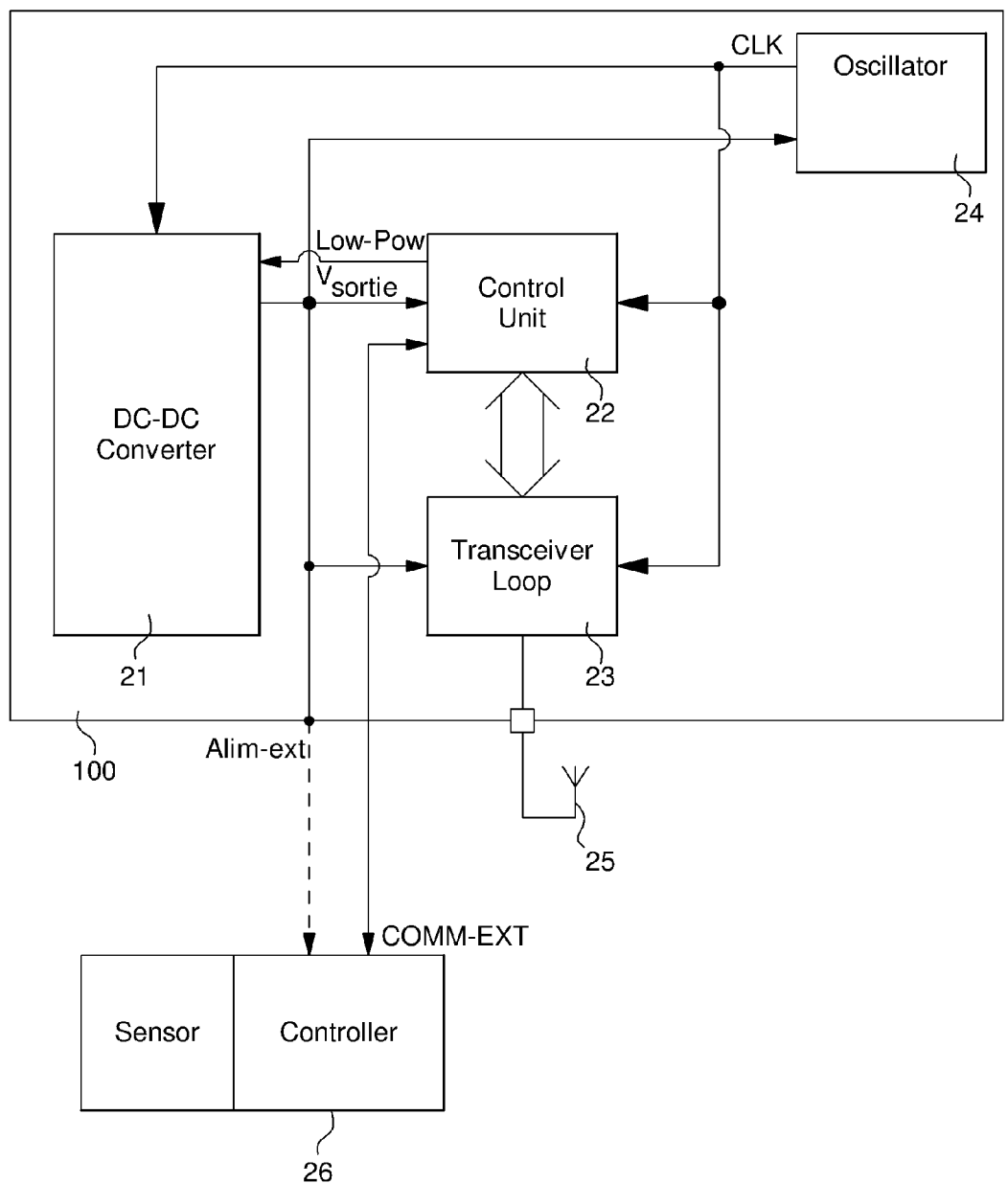
FIG. 4 shows schematically the transceiver circuit according to the present invention, when it is associated with an external peripheral unit.

Control unit 22 is the centre of the system, since it is this control unit 22 that is responsible for monitoring, controlling and managing transceiver circuit 100. This control unit 22 is also for managing external peripheral units, such as, for example, a measuring cell, formed of a sensor and its management controller. This example is used in the following description, but only for informative purposes. This is made possible by a series of input/outputs for managing peripheral units and is shown in FIG. 4.

It should be pointed out that the purpose of the DC-DC converter according to the present invention is not only to supply the transceiver with electricity. Even if the primary object of the DC-DC converter is to supply the transceiver circuit with electric power, from a voltage source with a lower-than-normal value, for example a 1.5 V rather than a 3 V battery, the converter output voltage can nonetheless still be used for powering one or more external peripheral units 26, via at least one output Alim-ext.

Oscillator 24 is accompanied by its division chain and it is used for providing the various frequencies used by the transceiver circuit elements.

For the transceiver part of circuit 100, transceiver loop 23 can be formed, for example, of a voltage controlled oscillator (VCO) and a filter-demodulator assembly. A mixer connects these two parts to each other. The assembly performs the modulation and demodulation necessary for all communications. The transceiver loop 23 opens onto an output of transceiver circuit 100, where an antenna 25 can be plugged in for the transceiver operations.

According to a first embodiment of this transceiver circuit 1, the command, which enables DC-DC converter 21 to pass from one operating mode to another, occurs exclusively via control unit 22 of transceiver circuit 100. Indeed, in such case, the change of operating mode of DC-DC converter 21 is directly linked to the change of operating mode of transceiver circuit 100.

Indeed, passage from one operating mode to another can be linked to an electrical parameter of circuit 100, such as current consumption. Thus, when the transceiver circuit communicates with the exterior, it is at that moment that it requires the maximum amount of current to operate. Consequently, DC-DC converter 21 must be configured to adapt. Conversely, when the transceiver circuit is not using these communication functions, its current requirements are thus lower, means the configuration of converter 21 has to adapt to respond to these new requirements in an optimum manner.

Consequently, control unit 22 of transceiver circuit 100 will monitor the electrical parameter on which the change in operating mode of the transceiver circuit assembly, including DC-DC converter 21, is based. If the control unit 22 sees that a change of state is necessary, then it will alter the state of the signal Low-Pow. This signal is transmitted to the converter, which will interpret it and act accordingly, i.e. act on the switching means for the converter. This causes a switch from one variable voltage regulator circuit to another, whose features are more suited to the state of the electrical parameter on which the change in operating mode is based. According to a second embodiment, the transceiver circuit control unit is not the only element capable of controlling the operating mode change of the DC-DC converter according to the present invention. Indeed, it may be integrated in the transceiver circuit logic that one of the external peripheral units 26 connected to the circuit of the present invention can carry out this command. This is possible because of a communication bus COMM-EXT, which allows communication between the peripheral units and the transceiver circuit and vice-versa.

In actual fact, the way in which the external peripheral units 26, such as measuring cells including a sensor and the controller thereof, operate, is close to that of our transceiver circuit. Just as the transceiver circuit passes from one operating mode to another in accordance with an electrical parameter such as current consumption, the measuring cell operates on a similar principle. According to this principle, when the measuring cell receives a command instructing it to make a measurement, the cell switches operating modes, in order to pass from a passive state, where nothing happens, to an active state, where the sensor is switched on to make a measurement.

Thus, in passive mode, the measuring cell consumes only a minimum amount of electrical power to remain in standby mode, whereas in active mode, the cell needs a sufficient amount of electrical power for its sensor and interface to operate properly. Consequently, it becomes necessary for the measuring cell, via its controller, to also be able to control the switch in operating mode of the DC-DC converter, which is used to power the cell.

Thus, when the measuring cell interface receives a command requiring it to make a measurement using its sensor, the interface will also order to sensor to start working. By virtue of the fact that the sensor is switched on, a quantity of electrical power will be required. If the interface sees that the quantity of electrical power available is insufficient, the interface will switch the DC-DC converter into the suitable mode, via the transceiver circuit control unit. The mode may be an operating mode that allows the converter to supply sufficient electrical power. This is achieved by acting on switching means 5 for the converter.

Nonetheless, in order to improve the security of the system, a priority, inhibition procedure has been installed. Indeed, without this device, and in the case of a control unit, which would take priority in selecting the operating mode to be applied, problems could arise. This concerns mainly the case where the control unit, which is monitoring the electrical parameter used as a basis for selecting the operating mode to be adopted, indicates to the converter that it should switch into low power consumption mode. Whereas, meanwhile, one of the peripheral units sends a request to control unit 22 for converter 21 to switch to normal mode. The converter then supplies a higher quantity of electrical power to the transceiver circuit.

For such cases, an inhibition system is provided, which enables the peripheral units connected to the transceiver circuit 100 to give a priority change of operating mode command for DC-DC converter 21, if the peripheral units 26 and control unit 22 of the transceiver circuit have different electrical power requirements.

Thus, inhibition can be achieved, for example, via a logic command. Depending upon its value, the logic command can indicate to control unit 22 that the peripheral unit(s) need power and that they should therefore have priority in controlling the DC-DC converter according to the present invention. Thus, if a command, indicating that a significant current requirement is requested, is transmitted, it automatically takes priority.

It will be clear that various alterations and/or improvements and/or combinations, which are evident to those skilled in the art could be made to the various embodiments of the invention set out above, without departing from the scope of the invention defined by the annexed claims.

What is claimed is:

1. A DC-DC converter for integration in a low power transceiver, wherein the converter is able to supply an output voltage that is higher than an input voltage, wherein the converter includes:
   (a) two distinct variable voltage regulator circuits including a first variable voltage regulator circuit arranged to operate at a first frequency with a first regulating mode and a second variable voltage regulator circuit arranged to operate at a second frequency, lower than the first frequency, with a second regulating mode; and
   (b) switching means that is connected to each variable voltage regulator circuit for selecting one of the two distinct variable voltage regulator circuits to be switched on the basis of an external electrical parameter supplied to the converter.

2. The DC-DC converter according to claim 1, wherein the first variable voltage regulator circuit includes variation means for varying and regulating voltage, and wherein the second variable voltage regulator circuit includes oscillation means and detection means that cooperate with each other to monitor voltage level of the output voltage relative to a minimum threshold and a maximum threshold.

3. The DC-DC converter according to claim 2, wherein the second variable voltage regulator circuit is arranged for pumping the output voltage as soon as the output voltage reaches the minimum threshold, and said second variable voltage regulator circuit pumps threshold voltage from the minimum threshold to the maximum threshold.

4. The DC-DC converter according to claim 1, wherein the first variable voltage regulator circuit authorises a first peak-to-peak voltage variation at a working frequency that is the first frequency.

5. The DC-DC converter according to claim 4, wherein the second variable voltage regulator circuit authorises a second peak-to-peak voltage variation that is higher than the first peak-to-peak voltage variation, at a working frequency that is the second frequency.

6. The DC-DC converter according to claim 1, further including:
   (c) regulating means for regulating a variation ratio between the output voltage and the input voltage.

7. The DC-DC converter according to claim 6, wherein the means for regulating a variation ration between the output voltage and the input voltage is a voltage divider.

8. The DC-DC converter according to claim 1, wherein the first variable voltage regulator circuit is capable of starting to work when the converter is in normal operating mode, and wherein the second variable voltage regulator circuit is capable of starting to work when the converter is in low power mode.

9. The DC-DC converter according to claim 2, wherein the detection means is a circuit operating in pulsed mode and thus measures the output voltage relative to the minimum threshold and maximum threshold at regular intervals.

10. The DC-DC converter according to claim 6, wherein the regulating means for regulating a variation ratio between the output voltage and the input voltage includes filtering means for extending a time between two pumping operations, in low power mode.

11. A low power transceiver including:
    (a) a control unit used for controlling the low power transceiver, wherein the control unit controls a demodulation loop and a frequency synthesiser of the low power transceiver for transmitting and receiving signals via an antenna, and
    (b) a DC-DC converter disposed in a same chip as other transceiver elements including the control unit, the demodulation loop and the frequency synthesizer, wherein the DC-DC converter supplies an output voltage that is higher than an input voltage, and wherein the converter includes
       i. two distinct variable voltage regulator circuits including a first variable voltage regulator circuit arranged to operate at a first frequency with a first regulating mode and a second variable voltage regulator circuit arranged to operate at a second frequency, lower than the first frequency, with a second regulating mode; and
       ii. switching means that is connected to each variable voltage regulator circuit for selecting one of the two distinct variable voltage regulator circuits to be switched on the basis of an external electrical parameter supplied to the converter.

12. The transceiver according to claim 11, wherein the control unit is capable of controlling a plurality of external peripheral units that are connectable to said transceiver and supplied with voltage by the DC-DC converter.

13. The transceiver according to claim 11, wherein the control unit of said transceiver supplies an electrical parameter that controls the switching means.

14. The transceiver according to claim 11, wherein the control unit of said transceiver is capable of being inhibited by one external peripheral unit of a plurality of external peripheral units so that the one external peripheral unit can supply an electrical parameter that controls the switching means.

15. The transceiver according to claim 14, wherein the control unit of the transceiver is capable of being inhibited by a controller connected to the transceiver so that the controller can supply the electrical parameter that controls the switching means.

16. The transceiver according to claim 11, wherein the DC-DC converter is operable to supply a higher voltage than a supply voltage so as to be used for powering the demodulation loop and the frequency synthesiser of the transceiver when signals are transmitted and received.

* * * * *